US012657165B2

(12) United States Patent
Colagrosso et al.

(10) Patent No.: US 12,657,165 B2
(45) Date of Patent: Jun. 16, 2026

(54) USING GENERATIVE MODELS FOR FILESYSTEM MANAGEMENT

(71) Applicant: GOOGLE LLC, Mountain View, CA (US)

(72) Inventors: Michael Colagrosso, Arvada, CO (US); Brandon Vargo, Boulder, CO (US); Catherine F. Johnson, Boulder, CO (US); Jesse Sterr, Erie, CO (US); Remy Burger, Boulder, CO (US); Summer Wang, Mountain View, CA (US); Zach Dicklin, Lafayette, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/781,645

(22) Filed: Jul. 23, 2024

(65) Prior Publication Data

US 2026/0030220 A1     Jan. 29, 2026

(51) Int. Cl.
 G06F 17/00 (2019.01)
 G06F 7/00 (2006.01)
 G06F 16/185 (2019.01)
(52) U.S. Cl.
 CPC ................................. G06F 16/185 (2019.01)
(58) Field of Classification Search
 CPC .................................................... G06F 16/185
 USPC ......................................................... 707/829
 See application file for complete search history.

(56) References Cited

U.S. PATENT DOCUMENTS

| | | | | |
|---|---|---|---|---|
| 5,771,379 | A * | 6/1998 | Gore, Jr. ................. | G06F 16/10 707/999.102 |
| 8,473,532 | B1 | 6/2013 | Ben | |
| 9,367,814 | B1 | 6/2016 | Lewis | |
| 11,100,057 | B2 * | 8/2021 | Kumar .................. | G06F 16/152 |
| 11,748,305 | B2 * | 9/2023 | Lee ........................ | G06F 40/205 707/828 |
| 11,809,374 | B1 * | 11/2023 | Meyer ..................... | G06F 16/16 |
| 12,117,964 | B2 * | 10/2024 | Groff .................... | G06F 16/248 |
| 2001/0042087 | A1 * | 11/2001 | Kephart ................ | G06F 16/353 707/E17.09 |
| 2004/0133589 | A1 * | 7/2004 | Kiessig ................... | G06F 16/10 707/999.102 |
| 2005/0044487 | A1 * | 2/2005 | Bellegarda ............ | G06F 18/231 707/E17.058 |
| 2006/0080278 | A1 * | 4/2006 | Neiditsch ................ | H04L 51/42 |

(Continued)

FOREIGN PATENT DOCUMENTS

CN          118861275          10/2024

*Primary Examiner* — Pavan Mamillapalli
(74) *Attorney, Agent, or Firm* — Gray Ice Higdon

(57) ABSTRACT

Implementations are provided for organizing and/or managing files and/or folders within filesystem hierarchies. In various implementations, an input prompt for a generative model may be assembled to include data indicative of: one or more files to be filed within a given filesystem hierarchy, and one or more filesystem hierarchies. The input prompt may be processed using the generative model to generate one or more recommendations of one or more folders within the given filesystem hierarchy for storing one or more of the files. Output may be rendered to convey one or more of the recommendations, which may be accepted to automatically implement the recommendations in some cases.

20 Claims, 7 Drawing Sheets

(56)　　　　　References Cited

U.S. PATENT DOCUMENTS

| | | | |
|---|---|---|---|
| 2009/0254345 A1 | 10/2009 | Fleizach | |
| 2011/0106846 A1 | 5/2011 | Matsumoto | |
| 2012/0089610 A1* | 4/2012 | Agrawal | G06F 16/20 |
| | | | 707/741 |
| 2019/0325084 A1 | 10/2019 | Peng et al. | |
| 2020/0065401 A1* | 2/2020 | Sooraj | G06F 16/183 |
| 2020/0387483 A1* | 12/2020 | Kumar | G06F 16/243 |
| 2023/0104324 A1* | 4/2023 | Groff | G06F 16/13 |
| | | | 707/694 |
| 2023/0177004 A1 | 6/2023 | Kong et al. | |
| 2023/0342337 A1* | 10/2023 | Mulcrone | G06F 16/93 |
| 2024/0273150 A1 | 8/2024 | Wolff | |
| 2024/0362467 A1 | 10/2024 | Deo | |
| 2025/0110865 A1* | 4/2025 | Gottiparthy | G06F 3/0631 |

* cited by examiner

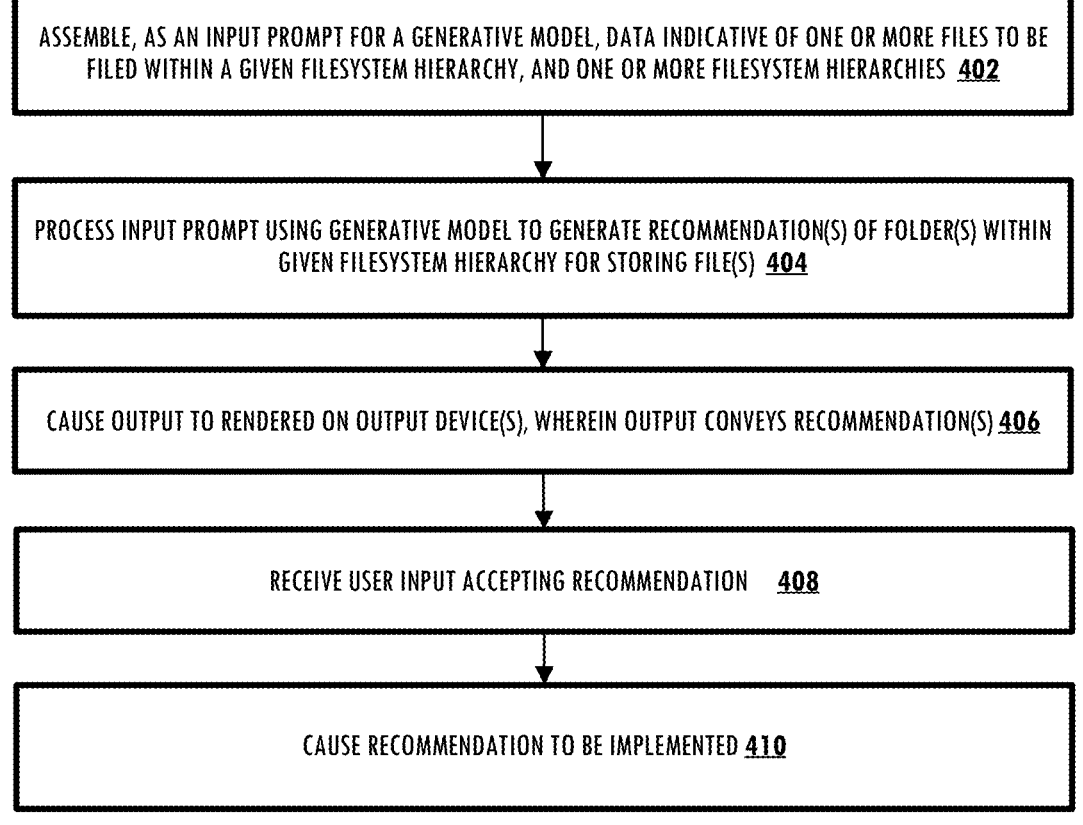

ASSEMBLE, AS AN INPUT PROMPT FOR A GENERATIVE MODEL, DATA INDICATIVE OF ONE OR MORE FILES TO BE FILED WITHIN A GIVEN FILESYSTEM HIERARCHY, AND ONE OR MORE FILESYSTEM HIERARCHIES 402

PROCESS INPUT PROMPT USING GENERATIVE MODEL TO GENERATE RECOMMENDATION(S) OF FOLDER(S) WITHIN GIVEN FILESYSTEM HIERARCHY FOR STORING FILE(S) 404

CAUSE OUTPUT TO RENDERED ON OUTPUT DEVICE(S), WHEREIN OUTPUT CONVEYS RECOMMENDATION(S) 406

RECEIVE USER INPUT ACCEPTING RECOMMENDATION     408

CAUSE RECOMMENDATION TO BE IMPLEMENTED 410

Fig. 4     400

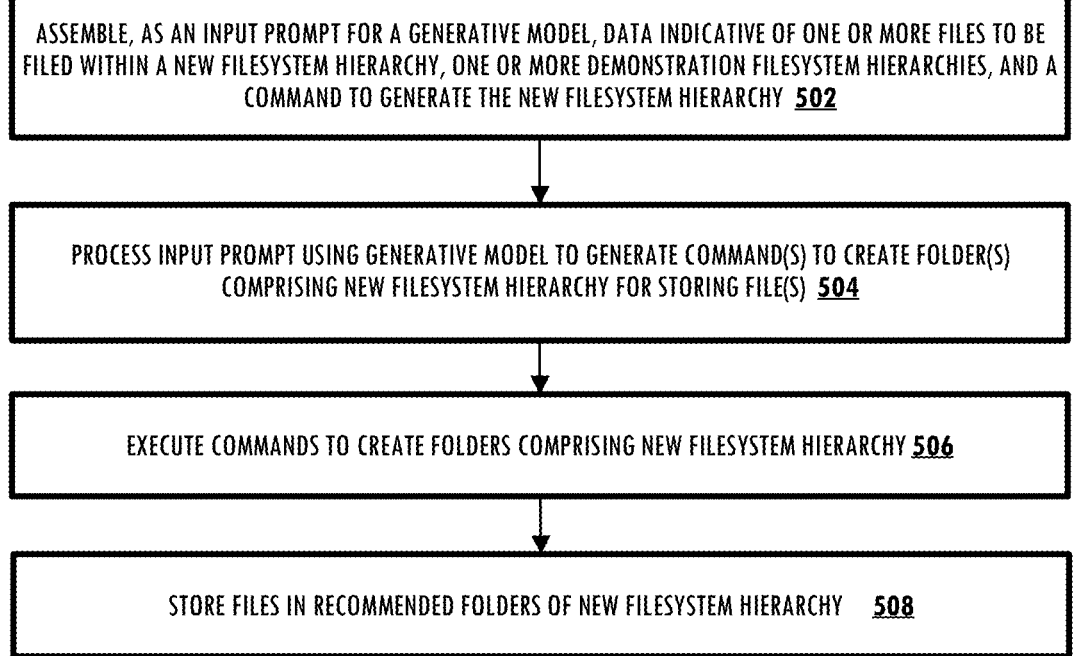

ASSEMBLE, AS AN INPUT PROMPT FOR A GENERATIVE MODEL, DATA INDICATIVE OF ONE OR MORE FILES TO BE FILED WITHIN A NEW FILESYSTEM HIERARCHY, ONE OR MORE DEMONSTRATION FILESYSTEM HIERARCHIES, AND A COMMAND TO GENERATE THE NEW FILESYSTEM HIERARCHY 502

PROCESS INPUT PROMPT USING GENERATIVE MODEL TO GENERATE COMMAND(S) TO CREATE FOLDER(S) COMPRISING NEW FILESYSTEM HIERARCHY FOR STORING FILE(S) 504

EXECUTE COMMANDS TO CREATE FOLDERS COMPRISING NEW FILESYSTEM HIERARCHY 506

STORE FILES IN RECOMMENDED FOLDERS OF NEW FILESYSTEM HIERARCHY     508

Fig. 5     500

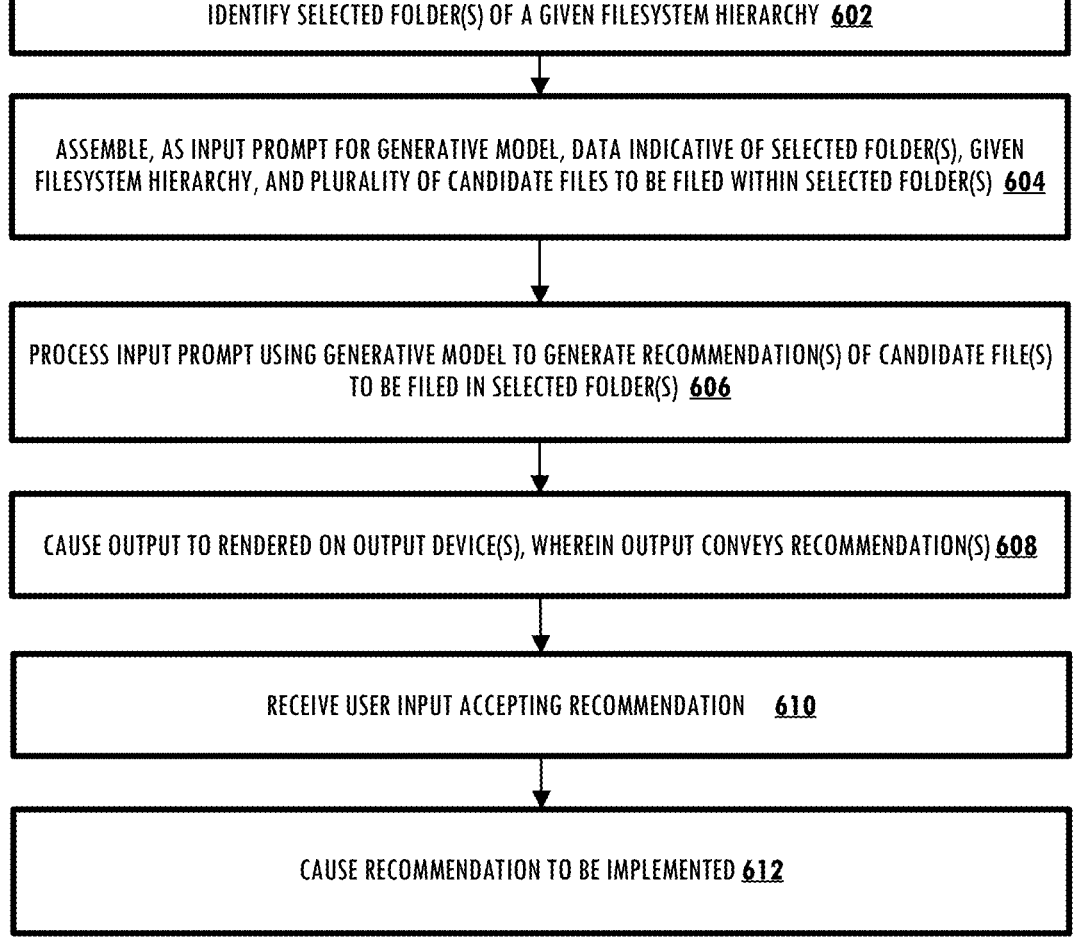

IDENTIFY SELECTED FOLDER(S) OF A GIVEN FILESYSTEM HIERARCHY 602

ASSEMBLE, AS INPUT PROMPT FOR GENERATIVE MODEL, DATA INDICATIVE OF SELECTED FOLDER(S), GIVEN FILESYSTEM HIERARCHY, AND PLURALITY OF CANDIDATE FILES TO BE FILED WITHIN SELECTED FOLDER(S) 604

PROCESS INPUT PROMPT USING GENERATIVE MODEL TO GENERATE RECOMMENDATION(S) OF CANDIDATE FILE(S) TO BE FILED IN SELECTED FOLDER(S) 606

CAUSE OUTPUT TO RENDERED ON OUTPUT DEVICE(S), WHEREIN OUTPUT CONVEYS RECOMMENDATION(S) 608

RECEIVE USER INPUT ACCEPTING RECOMMENDATION     610

CAUSE RECOMMENDATION TO BE IMPLEMENTED 612

Fig. 6          600

USING GENERATIVE MODELS FOR FILESYSTEM MANAGEMENT

BACKGROUND

Filesystem hierarchies are often used by people and organizations to organize individual files and folders in computer memory, such as on a local hard drive, on a file server, and/or in cloud-based storage. Filesystem hierarchies are only as well-organized as the people who create and maintain them. Different individuals and/or organizations may create and/or maintain filesystem hierarchies in different ways, depending on various factors such as personal preferences, habits/behaviors, naming conventions, organizational policies, security concerns, personnel changes, and so forth. Consequently, many filesystem hierarchies are not well organized.

SUMMARY

Implementations are described herein for organizing and/or managing files and/or folders within filesystem hierarchies. More particularly, but not exclusively, techniques described herein relate to leveraging generative models, such as large language models (LLMs), to process data associated with filesystem hierarchies and/or individual files to generate output such as recommendations, commands, etc., that will aid in organizing and/or managing filesystem hierarchies.

Implementations described herein provide various technical benefits. Improving how files are organized in a filesystem makes those files easier for users to find, which means fewer computing resources (e.g., processor cycles, network bandwidth) will be required to search for those files. Moreover, automatically organizing files and folders as described herein may lead to more efficient usage of memory. For instance, improved organization of files decreases the likelihood that files will be duplicated across a filesystem hierarchy, conserving memory.

Similarly, techniques described herein may be used to generate recommendations to consolidate files that, while not exact copies, contain duplicative information. For example, if a user obtains a copy of a spreadsheet and adds new information to the copy, techniques described herein may recommend that the user replace the original spreadsheet with the copy, since the original spreadsheet may now be outdated. In addition, files containing potentially sensitive, proprietary, and/or private information may be recommended for storage in locations (e.g., folders) where security is enforced, reducing the likelihood of security breaches.

In some implementations, a method may be implemented using one or more processors and may include: assembling, as an input prompt for a generative model, data indicative of: one or more files to be filed within a given filesystem hierarchy, and one or more filesystem hierarchies; processing the input prompt using the generative model to generate one or more recommendations of one or more folders within the given filesystem hierarchy for storing one or more of the files; and causing output to be rendered on one or more output devices, wherein the output conveys one or more of the recommendations.

In various implementations, the given filesystem hierarchy may be an existing filesystem hierarchy, and the data indicative of the one or more filesystem hierarchies may include data indicative of the given filesystem hierarchy. In various implementations, the data indicative of the one or more filesystem hierarchies may include one or more demonstration filesystem hierarchies. In various implementations, the input prompt may be further assembled to include a command to create all or part of the given filesystem hierarchy based on one or more of the demonstration filesystem hierarchies. In various implementations, the command may be to create all or part of the given filesystem hierarchy based on one or more of the demonstration filesystem hierarchies and one or more of the files to be filed within the given filesystem hierarchy. In various implementations, one or more of the demonstration filesystem hierarchies may be associated with a user account of a user who has requested the one or more recommendations.

In various implementations, the data indicative of the one or more filesystem hierarchies may include names assigned to individual files and folders of the given filesystem hierarchy. In various implementations, the data indicative of the one or more filesystem hierarchies may include metadata associated with individual files or folders of the filesystem hierarchy. In various implementations, the metadata associated with individual files or folders of one or more of the filesystem hierarchies may include user or group permissions assigned to individual files or folders of the filesystem hierarchy. In various implementations, the input prompt may be further assembled to include a request that one or more of the recommendations include a recommendation for a folder in which one or more of the files are to be stored, conditioned on one or more of the user or group permissions. In various implementations, the metadata associated with individual files or folders of one or more of the filesystem hierarchies may include access histories of the individual files or folders of the filesystem hierarchy. In various implementations, the metadata associated with individual files or folders of one or more of the filesystem hierarchies may include creation or modification times of the individual files or folders of the filesystem hierarchy.

In various implementations, the metadata for at least some of the files or folders of the filesystem hierarchy may include a parent ID. In various implementations, one or more of the recommendations may include a parent and file ID pair that identifies a destination for one or more of the files.

In various implementations, the metadata for at least one of the folders of the filesystem hierarchy may include a short description of contents of the at least one folder. In various implementations, the short description may be generated automatically by processing at least some documents within the at least one folder using the same generative model or a different generative model. In various implementations, the at least some documents may be selected based on access or modification histories of the at least some documents.

In various implementations, the metadata associated with individual files or folders of one or more of the filesystem hierarchies may include MIME types of individual files or folders of the filesystem hierarchy.

In various implementations, the method may include automatically storing the one or more files in non-transitory computer memory in accordance with the given filesystem hierarchy and one or more of the recommendations.

In various implementations, the method may include detecting user selection of an individual folder within the given filesystem hierarchy; and assembling, into the input prompt, a command to recommend one or more of the files for storage within the individual folder, wherein one or more of the recommendations comprises a recommendation to store one or more of the files within the individual folder.

In various implementations, the one or more files to be filed within a given filesystem hierarchy may include a plurality of files, and the method may include: grouping the plurality of files into clusters; and assembling data indicative of the clusters into the input prompt. In various implementations, the grouping may be based on computed embeddings for the plurality of files, one or more of the filesystem hierarchies, and/or metadata associated with the plurality of files. In various implementations, the grouping may be based on one or more of: MIME types of the plurality of files; creation dates of the plurality of files; access or modification histories of the plurality of files; or topics of the plurality of files.

In various implementations, the generative model may include a multimodal generative model, and one or more of the files to be filed within the given filesystem hierarchy may include an image.

In another aspect, a method may be implemented using one or more processors and may include: identifying one or more selected folders of a given filesystem hierarchy; assembling, as an input prompt for a generative model, data indicative of: the one or more selected folders, the given filesystem hierarchy, and a plurality of candidate files for filing in the one or more selected folders; processing the input prompt using the generative model to generate one or more recommendations of one or more of the candidate files to be filed in one or more of the selected folders; and causing output to be rendered on one or more output devices, wherein the output conveys one or more of the recommendations.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

BRIEF DESCRIPTION OF THE DRAWINGS

FIG. 4 schematically depicts an example method for practicing selected aspects of the present disclosure.

FIG. 5 schematically depicts an example method for practicing selected aspects of the present disclosure.

FIG. 6 schematically depicts an example method for practicing selected aspects of the present disclosure.

DETAILED DESCRIPTION

Figure 1:
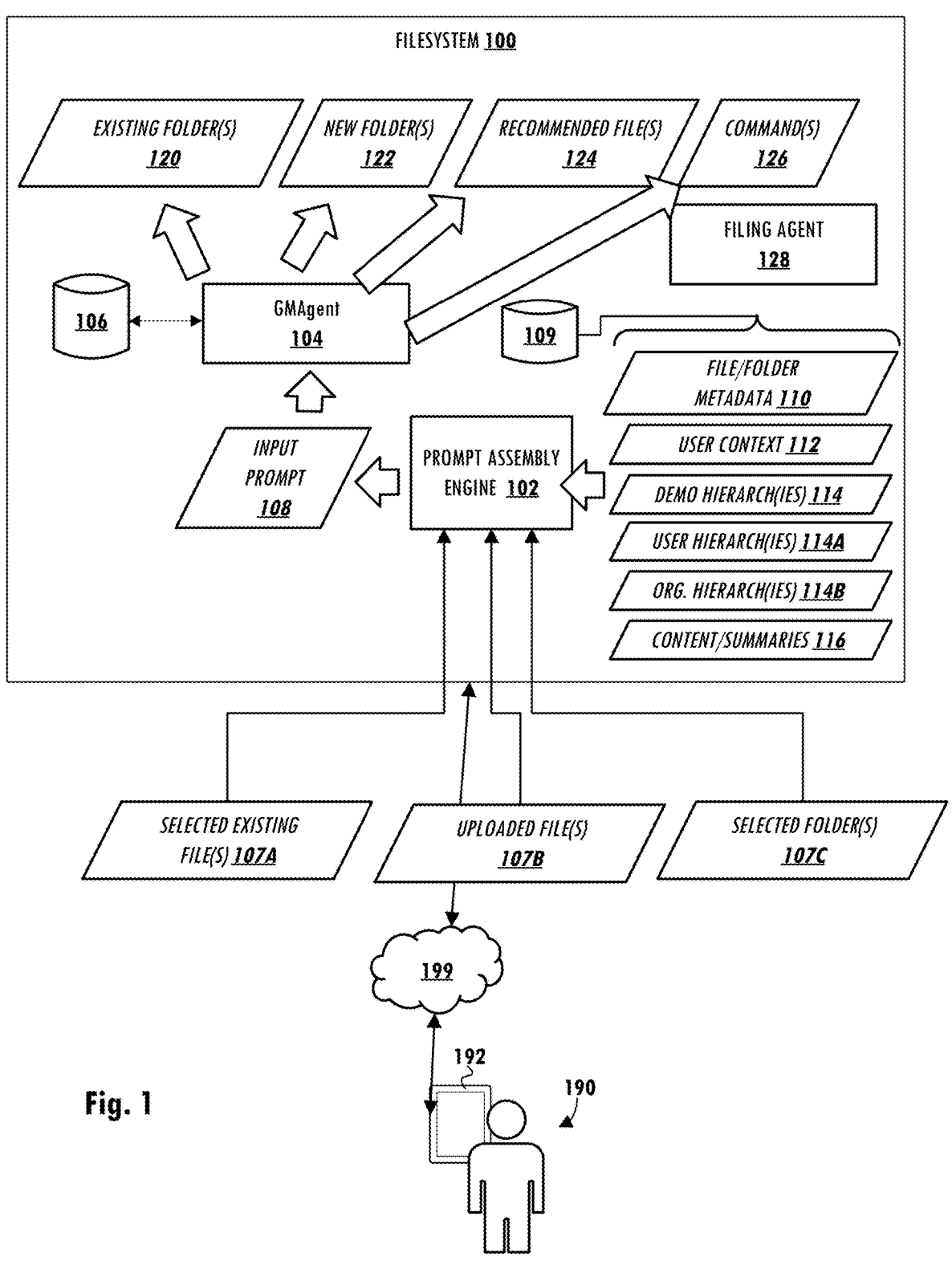
FIG. 1 schematically depicts an example environment in which selected aspects of the present disclosure may be implemented.

Implementations are described herein for organizing and/or managing files and/or folders within filesystem hierarchies. More particularly, but not exclusively, techniques described herein relate to leveraging generative models, such as large language models (LLMs), to process data associated with filesystem hierarchies and/or individual files to generate output such as recommendations, commands, etc., that will aid in organizing and/or managing filesystem hierarchies.

Implementations described herein may be used in various scenarios. In several scenarios, files may need to be organized into a filesystem hierarchy, e.g., after those files have been uploaded to the cloud or another storage location. Techniques described herein can be used to recommend destination(s) for those files in the filesystem hierarchy. These recommendations can include existing destinations (e.g., folders) or recommendations for new destinations (e.g., new hierarchies, sub-hierarchies, and/or folders) to be generated. Suppose each time a user (or organization) onboards a new client, they create a new folder sub-hierarchy for the client that follows a pattern. In various implementations, when the user/organization uploads files for a new client, a recommendation to create a new folder sub-hierarchy for that new client that is modeled after other clients' folder hierarchies may be provided to the user. In some implementations, user(s) can accept these recommendations to cause those folders to be created and/or for files to be filed automatically in those recommended destinations/newly created folders.

In various implementations, data indicative of one or more demonstration filesystem hierarchies may be assembled into an input prompt for a generative model such as an LLM. These demonstration hierarchies may be used to condition the generative model to generate recommendation(s) that are similar to or otherwise influenced by the demonstration hierarchies. Demonstration filesystem hierarchies may come from various sources. A user or organization (e.g., a business) may have its own example hierarchies that have developed organically or that have been imposed by policy. Other demonstration hierarchies may come from users or organizations that opt in to allow their filesystem hierarchies to be used as examples. In some such cases, these filesystem hierarchies may be anonymized prior to being made available to others.

Data indicative of filesystem hierarchies may contain various data (e.g., metadata) about the folders and files that form the hierarchy. This data may include, for instance, file IDs, folder IDs, parent IDs, Multipurpose Internet Mail Extensions (MIME) types of individual files, file names, folder names, creation dates, authors, file sizes, access histories, modification histories, textual summaries (which will be described in more detail below), and so forth. In some implementations, the data indicative of filesystem hierarchies may include security information, such as permissions granted to users and/or groups vis-à-vis particular folders and/or files, encryption schemes employed on particular files, etc.

The input prompt may also be assembled to include data indicative of one or more files that are to be organized into an existing or new (to be created) filesystem hierarchy. The data indicative of the files to be organized may include similar data as was provided corresponding to the filesystem hierarchy and/or its individual folders/files, such as metadata, content summaries, and so forth.

In another scenario, when a user views or otherwise selects a folder, techniques described herein may be used to seek out files that are suitable for storage in that folder. These files may come from a "holding" folder of files that need to be filed, and/or may be files stored elsewhere in the filesystem hierarchy that may be more sensibly stored in the current folder.

In some implementations, individual files may be encoded into embeddings that may be stored in a vector database and used to match those individual files to potential destination folders. Folder embeddings may be generated (e.g., precomputed or on the fly) by processing files stored within those folders. Folder embeddings may then be used as queries to locate files (e.g., using techniques such as cosine similarity) that may be suitable for storage in those folders.

In some instances, folders may store large numbers of files, and many of these files may not have been accessed for some time (e.g., have become "stale"). Consequently, generating a folder embedding based on all these files may be computationally expensive (e.g., might introduce significant latency) and/or may not provide the best representation of the folder's contents (e.g., newer or "fresher" content may be more representative of an organization's current goals or strategies). Accordingly, in some implementations, folder embeddings may be generated using less than all of the contents of a folder. For example, only the n most recently accessed/modified/created files may be used to generate the folder embedding. Additionally or alternatively, files within a folder may be grouped into clusters based on factors such as content, keywords, access/modification/creation history, etc. In some cases, those files that are grouped into the m most recent clusters may be used to generate the folder embedding.

In some implementations, data indicative of dependencies between files and/or folders may be used to condition the recommendations that are generated using the generative models. Source code files, for instance, often incorporate other source code files. Additionally, applications often use separate database files to store data. For example, spreadsheets are often configured to retrieve data from external sources, such as database files stored in the same folder or a different folder. In some implementations these dependencies between files may be extracted and represented explicitly in the input prompt, e.g., as annotations indicating which files depend from others, etc. In other implementations, the input prompt may be assembled to include a request to account for various types of dependencies expressed within files that are to be organized into the filesystem hierarchy and/or files/folders that already exist in the filesystem hierarchy. By conditioning the generative model in this way, the recommendations may be more likely to preserve inter-file dependencies that, if otherwise broken, might cause functionality associated with various files to break down.

FIG. 1 is a schematic diagram illustrating components that can cooperate to carry out selected aspects of the present disclosure, in accordance with various implementations. The various components depicted in FIG. 1, particularly those components forming a filesystem 100, may be implemented using any combination of hardware and software. The components of FIG. 1 are depicted as being communicatively coupled with each other via one or more networks 199, which may include one or more personal area networks, local area networks, and/or wide area networks (e.g., the Internet). However, this is not meant to be limiting. Various aspects of the present disclosure that are described as being performed by and/or stored on filesystem 100 can alternatively be performed by and/or stored elsewhere and/or distributed across multiple systems, such as between filesystem 100 and a client device 192.

In some implementations, filesystem 100 may include one or more computing devices cooperating to perform selected aspects of the present disclosure. An example of such a computing device is depicted schematically in FIG. 7. In some implementations, such as that depicted in FIG. 1, filesystem 100 may include one or more servers forming part of what is often referred to as a "cloud" infrastructure, or simply "the cloud." This is not meant to be limiting, however, and in other cases, one or more components of filesystem 100 may be operated by client device 192. For example, techniques described herein may be used to organize and/or manage filesystems that are or wholly local to client device 192, or at least partially maintained on client device 192. For instance, techniques described herein may be applicable for cloud storage services that allow for synchronization between a cloud-based filesystem and local copies of all or parts of a cloud-based filesystem.

Filesystem 100 may include a generative model agent (GMAgent) 104 communicatively coupled with one or more generative models 106. Machine learning and/or generative model(s) 106 described herein may take various forms, including, but not limited to, model(s) such as PaLM, BERT, LaMDA, Meena, and/or any other generative model, such as any other generative model that is encoder-only based, decoder-only based, sequence-to-sequence based and that optionally includes an attention mechanism or other memory, diffusion model(s), etc. Generative models may have hundreds of millions, or even hundreds of billions of parameters. In some implementations, generative models may include multi-modal models such as a vision-language model (VLM) and/or a visual question answering (VQA) model, which can have any of the aforementioned architectures, and which can be used to process multiple modalities of data, particularly images and text, and/or images and audio for example, to generate one or more modalities of output. Non-limiting examples of VLMs that may be applied as described herein include Gemini and/or Flamingo, to name a few.

In various implementations, a user 190 may interact with filesystem 100 using client device 192. While depicted as a tablet computer or smart phone in FIG. 1, client device 192 may take other forms, such as a desktop or laptop computer, in-vehicle computing device, augmented reality (AR) and/or virtual reality (VR) headset or glasses, standalone "smart" speakers that host automated assistants that can be interacted with, etc.

While shown as separate systems that communicate using network(s) 199, this is not meant to be limiting. Aspects of filesystem 100 may be implemented in whole or in part on client device 192. If client device 192 includes sufficient computing resources, and/or generative model(s) it uses can be made sufficiently "lean," it may be desirable to implement techniques described herein locally on client device 192 to avoid latency introduced by a round trip across network(s) 199. Implementing techniques described herein locally on client device 192 may also be advantageous where client-side encryption is enabled, since a cloud-based filesystem may not have access to the content of files.

User 190 may operate client device 192 to interact with filesystem 100 in various ways to facilitate generation of recommendations for organizing a filesystem hierarchy and/or for automatically implementing those recommendations. In some instances, user 190 may select one or more existing files 107A that the user wishes to organize within an existing filesystem hierarchy or in a to-be-generated filesystem hierarchy. User 190 may identify existing file(s) 107A that are already stored on filesystem 100 in various ways, e.g., by operating a graphical user interface (GUI) to select them, e.g., by drawing a selection box around icons representing the files, selecting a folder containing the to-be organized files, etc.

In other implementations, user 190 may upload a batch of files 107B to filesystem 100. This may trigger performance of techniques described herein to generate recommendations of existing folder(s) 120 in which those uploaded files should be filed and/or new folder(s) 122 to be generated for storage of the uploaded files 107B. In yet other implementations, user 190 may select one or more existing folders 107C. This may trigger performance of techniques described herein to search for and recommend files 124 to be stored in the selected folder(s) 107C.

A prompt assembly engine 102 may be configured to generate input prompts 108 to be processed by GMAgent 104. Prompt assembly engine 102 may be configured to obtain data for assembly into input prompts from a variety of sources. For example, prompt assembly engine 102 may assemble data indicative of one or more of selected file(s) 107A, uploaded file(s) 107B, and/or selected folder(s) 107C into an input prompt.

Additionally, prompt assembly engine 102 may assemble other data 109 into input prompts. For example, other data 109 may include data indicative of file/folder metadata 110, which prompt assembly engine 102 can assemble into input prompts. File/folder metadata 110 may include various data, such as user or group permissions assigned to individual files or folders of the filesystem hierarchy, access histories of the individual files or folders of the filesystem hierarchy, creation or modification histories of the individual files or folders of the filesystem hierarchy, parent IDs, short descriptions of contents of files and/or folders (in some implementations, these short descriptions or summaries may be generated using generative models), MIME types of individual files or folders of the filesystem hierarchy, file dependencies, tags (e.g., locations at which images were captured), and so forth.

In some implementations, other data 109 may include data indicative of a user context 112 of user 190 into an input prompt. User context 112 may include a variety of different signals, such as time-of-day, location, user access rights, user preferences, group membership, history of folders and/or files accessed by user 190, and so forth. User context 112 may condition generative model 106 so that it is more likely to generate output that is useful to user 190. This may include, for instance, folder(s) to which user 190 has access, folder(s) which are accessed by user 190 frequently, and/or which have been accessed by user 190 recently, and so forth.

In some implementations, other data 109 may include data indicative of demonstration filesystem hierarchies 114, which prompt assembly engine 102 can assemble into input prompt 108. For example, other users and/or organizations may allow or otherwise provide their own filesystem hierarchies for use as exemplars. Additionally or alternatively, the user's own existing hierarchies 114A, or organizational hierarchies 114B provided by an organization of which user 190 is a member, may be used as demonstration hierarchies 114, so that the user's or organization's "style" of organizing files, naming conventions, etc., are imposed on the generative model output. Demonstration filesystem hierarchies 114, user hierarchies 114A, and/or organization hierarchies 114B may condition generative model 106 to generate output that resembles or otherwise is influenced or guided by one or more of these various filesystem hierarchies 114, 114A, 114B. Data indicative of one or more of these filesystem hierarchies 114, 114A, 114B may be formulated in various ways within input prompt 108, such as by using textual representations of the filesystem hierarchies (e.g., graph modeling language or "GML", JavaScript Object Notation or "JSON", extensible markup language or "XML", etc.), images of the demonstration filesystem hierarchies 114, 114A, 114B, etc.

GMAgent 104 may be configured to process any number of input prompts, e.g., beginning with input prompt 108, and/or data indicative thereof (e.g., embedding(s)) using one or more generative models 106 to generate various types of output. Depending on the circumstances, this output may vary. If user 190 selects existing files 107A and/or uploads new files 107B, for instance, GMAgent 104 may generate recommendation(s) that identify existing folder(s) 120 for storage of the files 107A/107B, and/or new folder(s) 122 to be created for storage of the files 107A/107B. If user 190 selects existing folder(s) 107C, by contrast, then GMAgent 104 may generate recommendation(s) of file(s) 124, e.g., selected from a larger set of candidate files (e.g., files stored in a temporary holding folder), that should be stored in the selected folder(s) 107C.

In some implementations, a filing agent 128 may be implemented at filesystem 100 and/or at user device 195. Filing agent may be implemented using any combination of software and hardware. In some instances, an operating system or filesystem manager of filesystem 100 may act as filing agent 128. Filing agent 128 may be configured to automatically implement recommendations generated by GMAgent 104, e.g., by creating folder(s), moving files, consolidating files, etc. In some implementations, output generated by GMAgent 104 using generative model(s) 106 may include command(s) 126 that can be performed by filing agent 128 to organize files/folders in accordance with the recommendations. For example, commands 126 may include shell commands that are often used at command line interfaces to organize files and folders, such as "cd", "mv", "mkdir", "rm", "del", "cp", etc. In other implementations, filing agent 128 may transmit commands 126 or other data to an underlying operating system or filesystem manager, which may then effectuate the recommendations generated by GMAgent 104.

Figure 2:
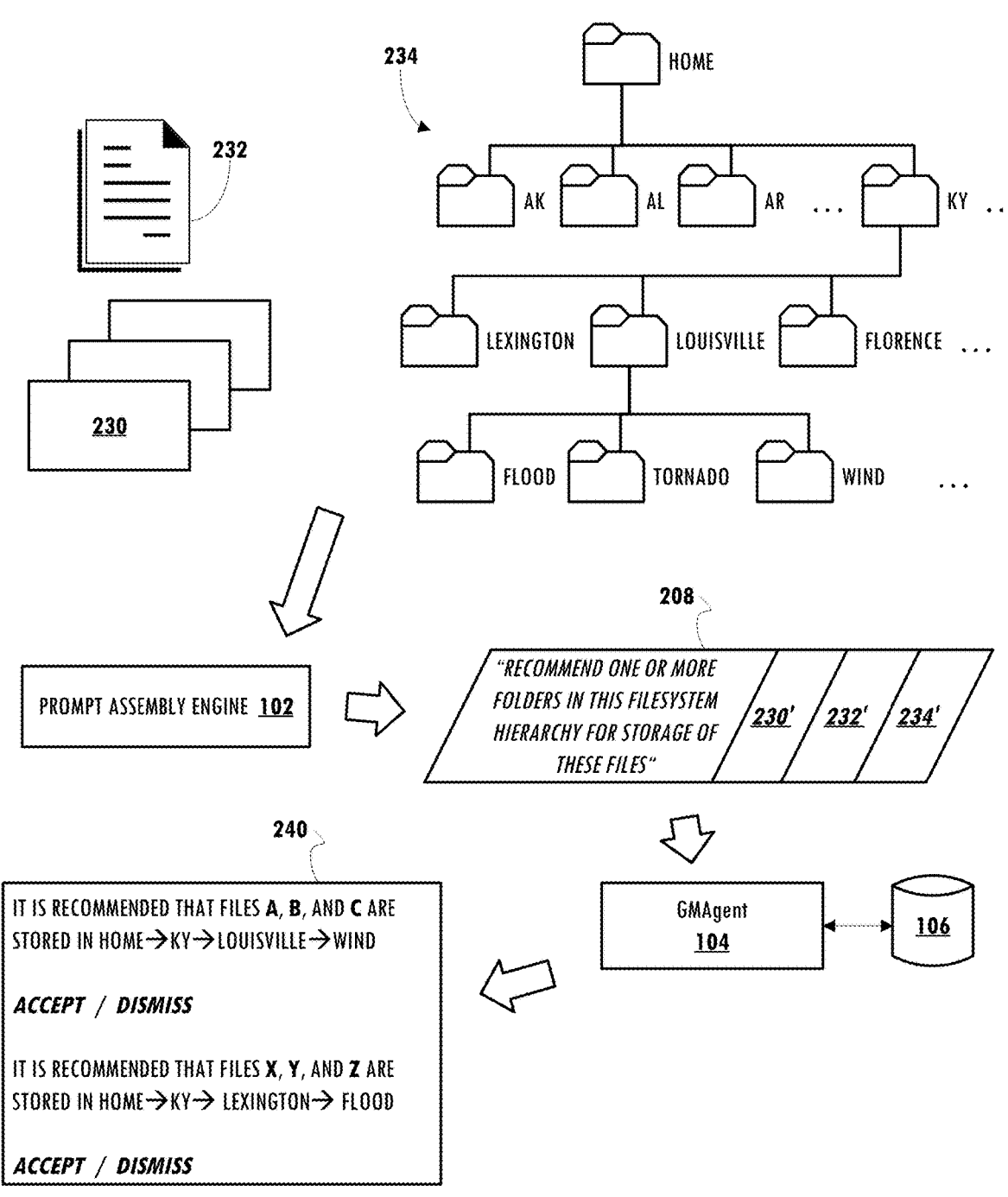
FIG. 2 schematically depicts an example of how data may be processed by various components configured with selected aspects of the present disclosure.

FIG. 2 schematically depicts an example of how data may be processed by various components configured with selected aspects of the present disclosure. Starting at top, assume a user selects and/or uploads some files to a cloud-based filesystem, such as some images 230 and some textual documents 232. In various implementations, prompt assembly engine 102 may assemble an input prompt 208 that includes data indicative of these files 230, 232.

Additionally, prompt assembly engine 102 may assemble into input prompt 208 data indicative of at least one demonstration filesystem hierarchy 234. Demonstration filesystem hierarchy 234 may share characteristics with one or more of hierarchies 114-114B. In this example, demonstration filesystem hierarchy 234 includes, a top, a "home" folder. Underneath/within the home folder are folders corresponding to various states of the United States, including Alaska (AK), Alabama (AL), Arkansas (AR), and Kentucky (KY). As indicated by the ellipses, other folders corresponding to other states may also be included.

Within the KY folder (and possibly within other states' folders, although not depicted), there are three additional subfolders corresponding to metropolitan areas of Kentucky, including Lexington, Louisville, and Florence. And within the Louisville subfolder (and possibly within the other cities' folders as well), there are at least three additional subfolders: Flood, Tornado, and Wind. As part of this working example, assume that images 230 are high-elevation images (e.g., captured by satellites, aircraft, drones, etc.) that capture areas of Lexington and Louisville. Assume further that textual documents 232 include observations about Lexington and Louisville that are obtained from various personnel (e.g., insurance inspectors, first responders, etc.). More particularly, assume that the files 230/232 provide evidence of wind damage in Louisville, and of flood damage in Lexington.

Prompt assembly engine 102 may be configured to assemble input prompt 208 with one or more commands. These commands may be determined based on factors such what user 190 has provided (e.g., selected/uploaded file(s) versus selected folder(s)), what other information is available to prompt assembly engine 102, etc. In this example, prompt assembly engine 102 assembles input prompt 208 to include the command, "recommend one or more folders in this filesystem hierarchy for storage of these files." Also assembled into input prompt 208 are data 230' indicative of images 230, data 232' indicative of textual documents 232, and data 234' indicative of filesystem hierarchy 234. These data 230'-234' may include, for example, textual tokens, numeric embeddings/vectors, etc. that convey or otherwise represent various information, such as file or folder access/modification timestamps, geotags, permissions, dependencies, etc.

GMAgent 104 may process input prompt 208 using one or more generative models 106 to generate output 240. In this example, output 240 includes a first recommendation that files A, B, and C (which can be drawn from images 230 and/or textual documents 232) be stored in the file path home→KY→Louisville→Wind. Following this recommendation are selectable elements "accept" and "dismiss," which may be selected to cause filing agent 128 to automatically implement the recommendation (e.g., by moving the files into the designated folder) or reject the recommendation, respectively. Output also includes a second recommendation that files X, Y, and Z (which also can be drawn from 230 and/or 232) be stored in the file path home-→KY→Lexington→Flood. Again, following this second recommendation are selectable elements "accept" and "dismiss," which may be selected to cause filing agent 128 automatically implement the recommendation, or to reject the recommendation, respectively.

Figure 3:
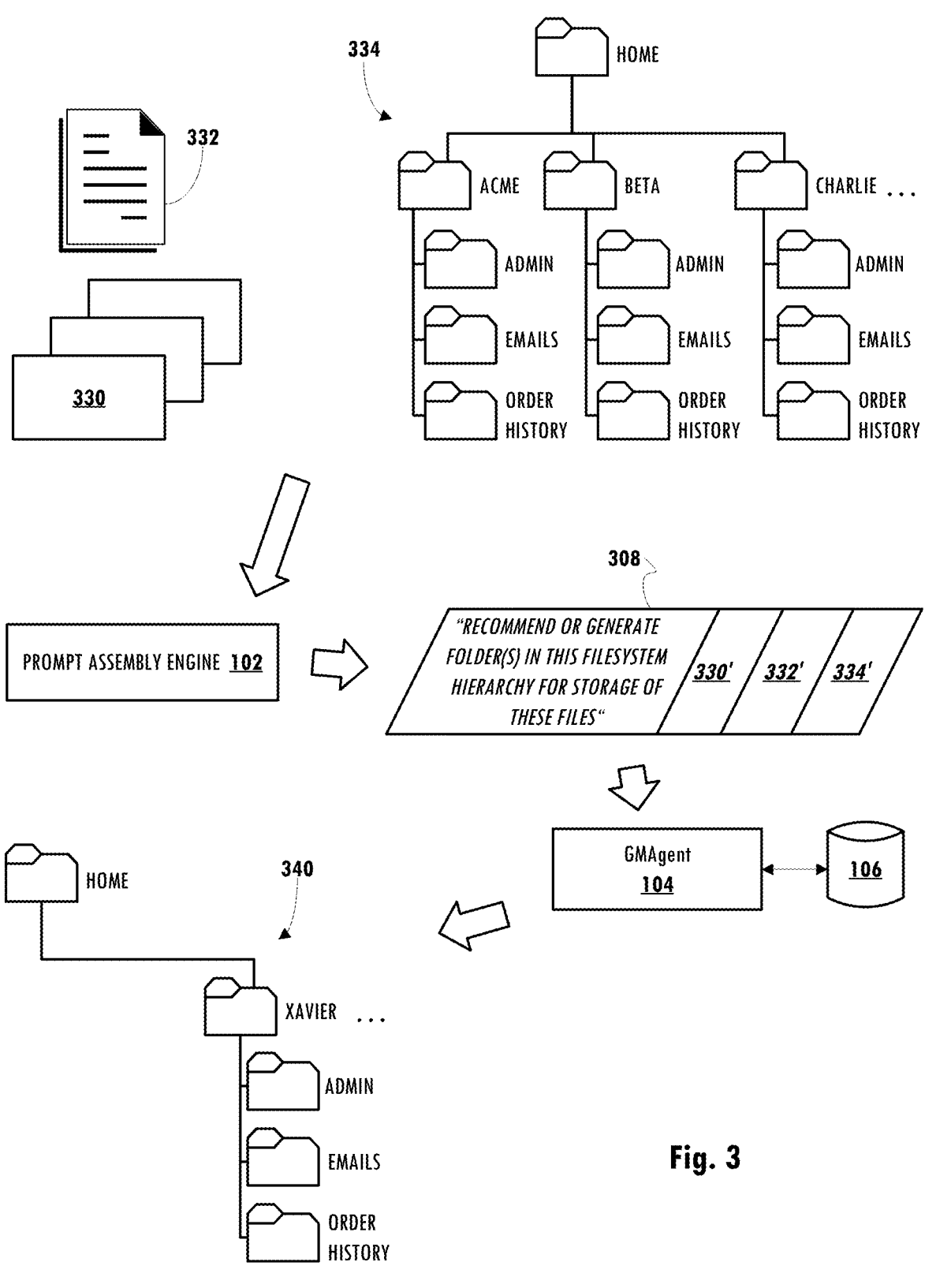
FIG. 3 schematically depicts another example of how data may be processed by various components configured with selected aspects of the present disclosure.

FIG. 3 schematically depicts another example of how data may be processed by various components configured with selected aspects of the present disclosure. Starting at top, assume user 190 once again selects and/or uploads some images 330 and textual documents 332 (other modalities of data are also supported, such as spreadsheets, videos, audio, etc.). Assume further that images 330 and textual documents 332 relate to a new client called "Xavier."

In this example, prompt assembly engine 102 also has access to a demonstration filesystem hierarchy 334 that is associated with an employer of user 190. Demonstration filesystem hierarchy 334 includes a "home" folder at top. Home folder includes subfolders for a plurality of clients, such as "Acme," "Beta," "Charlie," and so on. Each of the client subfolders additional includes the same subfolders, including "admin," "emails," "order history," and so on. The structure of filesystem hierarchy 334 demonstrates that the organization tends to arrange files associated with clients into uniform subfolder hierarchy structures.

Prompt assembly engine 102 assembles an input prompt 308 that includes data 330' indicative of images 330, data 332' indicative of textual documents 332, and data 334' indicative of demonstration filesystem hierarchy 334. Prompt assembly engine 102 also assembles into input prompt 308 a command to "Recommend or generate folder (s) in this filesystem hierarchy for storage of these files."

GMAgent 104 processes input prompt 308 using generative model(s) 106 to generate output 340. In this example, output 340 includes data indicative of a subfolder hierarchy, e.g., that can be added to demonstration filesystem hierarchy 334. This subfolder hierarchy includes a folder for the new client, "Xavier," as well as the same folders as are included with other clients, namely, "admin," "emails," "order history," and so on. In various implementations, user 190 may be able to accept the recommended subfolder hierarchy expressed in output 340 in order for that folder hierarchy to be created automatically, e.g., by filing agent 128. For example, while not shown in FIG. 3, in some implementations, output 340 may include a sequence commands (e.g., shell commands) to create the subfolder hierarchy, such as "cd/home, mkdir Xavier, cd Xavier, mkdir admin, mkdir emails, mkdir 'order history'," and so on. If user 190 accepts the recommendation of output 340, these commands may be implemented automatically, e.g., as a shell script that is executed by filing agent 128. In other implementations, to conserve resources, the output 340 may not include the shell commands, only the recommendations. Instead, if the user accepts the recommendation(s), new input prompt(s) may be generated, e.g., by prompt assembly engine 102 or filing agent 128, that request shell commands based on the accepted recommendation(s). Processing of these new input prompts by GMAgent 104 may generate the shell commands.

Referring now to FIG. 4, an example method 400 is depicted for carrying out selected aspects of the present disclosure. For convenience, the operations of the flowchart are described with reference to a system that performs the operations. This system may include various components of various computer systems, including those depicted in FIGS. 1-3. Moreover, while operations of method 400 are shown in a particular order, this is not meant to be limiting. One or more operations may be reordered, omitted or added.

At block 402, the system, e.g., by way of prompt assembly engine 102, may assemble, as an input prompt (e.g., 108, 208, 308) for a generative model (e.g., 106), data indicative of: one or more files (e.g., 107A-B, 230/232, 330/332) to be filed within a given filesystem hierarchy. These file(s) may be preexisting file(s) that are selected by the user (e.g., 107A), or new files that are created, uploaded (e.g., 107B), or otherwise newly provided to the filesystem.

Prompt assembly engine 102 may also assemble the input prompt to include data indicative of one or more filesystem hierarchies. Data indicative of filesystem hierarchies may include, for example, names assigned to individual files and folders of a filesystem hierarchy, metadata associated with individual files and/or folders of the hierarchy, content of the files (alone or combined with other files of the same folder), and so forth. This data indicative of filesystem hierarchies may be expressed or formulated in various ways, such as using structured text (e.g., JSON, GML, XML, etc.), images, lists of folder IDs paired with parent IDs, etc. These one or more filesystem hierarchies may or may not be related to the task at hand and/or to the user/organization who is making the request. For example, in some cases, one or more of the filesystem hierarchies may include a filesystem hierarchy implemented by the user (e.g., associated with a user account of a user who has requested the one or more recommendations) and/or an organization to which the user belongs. Additionally or alternatively, one or more of the filesystem hierarchies may include unrelated demonstration filesystem hierarchies, e.g., provided by others who opt in or otherwise permit their filesystem hierarchies to be used.

In some implementations, the system, e.g., by way of prompt assembly engine 102, may assemble into the input prompt a command to create all or part of the given filesystem hierarchy, e.g., based on one or more demonstration filesystem hierarchies. For example, if the user wishes to organize the files into a new filesystem hierarchy, the input prompt may be assembled with a command to build the filesystem hierarchy from scratch, e.g., conditioned on the demonstration hierarch(ies) that are also provided, and/or conditioned on one or more of the files to be filed within the given filesystem hierarchy.

In some implementations, the data indicative of the one or more filesystem hierarchies that is assembled by prompt assembly engine 102 into the input prompt may include metadata associated with individual files or folders of one or more of the filesystem hierarchies. The metadata associated with individual files or folders of the one or more filesystem hierarchies may include, for instance, user or group permissions assigned to individual files or folders. In some such implementations, prompt assembly engine 102 may further assemble the input prompt to include a request that one or more of the recommendations include a recommendation for a folder in which one or more of the files are to be stored, conditioned on one or more of the user or group permissions.

Additionally or alternatively, in some implementations, the metadata associated with individual files or folders of the one or more filesystem hierarchies that is assembled by prompt assembly engine 102 into the input prompt may include access histories of the individual files or folders of one or more of the filesystem hierarchies. Additionally or alternatively, in some implementations, the metadata associated with individual files or folders of one or more of the filesystem hierarchies includes creation or modification times of the individual files or folders of the filesystem hierarchy. These access histories and/or creation/modification times may be used, for instance, to increase or decrease the likelihood that particular folders will be recommended as destinations for one or more of the files to be filed. For instance, folders that have been used more recently and/or more frequently may be more likely to be recommended than folders that have been dormant for some time.

In some implementations, the metadata associated with individual files or folders of one or more of the filesystem hierarchies may include parent IDs. In some such implementations, one or more of the recommendations generated by GMAgent 104 may include a parent and file ID pair that identifies a destination for one or more of the files.

The content of the files and/or folders themselves may be harvested to generate additional metadata in some implementations. For example, in some implementations, the metadata for folder(s) of the filesystem hierarchy may include a short description of contents of the folder(s). Such a short description may be generated automatically in some cases, e.g., by GMAgent 104 processing at least some documents within the targeted folder using the same generative model 106 as is used to generate recommendations described herein, or using a different generative model (e.g., a general purpose LLM). Some folders may contain very large numbers of documents, making generation of such a summarization challenging from a computational and/or time standpoint. Accordingly, in some implementations, a subset of documents that are to be used to generate the folder summary may be selected from the folder based on various signals, such as access or modification histories of the at least some documents, content, etc. Intuitively, recently-accessed and/or modified documents may provide for a fresher summarization of the folder's contents than, say, a summarization of all files, including legacy files that haven't been accessed in some time.

Types of files and folders that are contained the filesystem hierarchies may be used as well. For example, the metadata associated with individual files or folders of one or more of the filesystem hierarchies may include MIME types of individual files or folders of the filesystem hierarchy. These data may condition the generative model to generate output that is more likely to suggest storing the files to be filed in similar locations as already-existing files of the same or similar MIME types. For example, MP3 files may be more likely recommended for storage with other audio-only files, whereas MP4 files may be more likely recommended for storage with other video files. And MP3 or MP4 files may be more likely recommended for storage with other multimedia files than, say, architecture drawings, source code files, etc.

Referring back to FIG. 4, at block 404, the system, e.g., by way of GMAgent 104, may process the input prompt using generative model(s) 106 to generate recommendation(s) of folder(s) within the given filesystem hierarchy (which may or may not correspond to one of the demonstration filesystem hierarchies) for storing the one or more files to be filed. These recommendations may be expressed or formulated in various ways, such as pairs of filenames and proposed file paths for those files (as shown in FIGS. 2-3), sequences of instructions such as shell commands to create folders and/or move files into newly created or existing folders, filenames paired with folder IDs of folders in which those files should be stored, etc.

In some implementations, at block 406, the system may cause output to be rendered on one or more output devices, such as at client device 192. In various implementations, the output may convey one or more of the recommendations, e.g., alone or in combination with a selectable element (e.g., "Accept|Dismiss") that when selected, causes the recommendation to be implemented automatically by filing agent 128.

At block 408, the system may receive user input accepting the recommendation(s), e.g., by clicking "Accept." In some implementations, user 190 may either accept or reject a recommendation. Additionally or alternatively, in some implementations, user 190 may accept part of the recommendation and reject the rest. For example, user 190 may select (e.g., by checking or unchecking radio buttons) a subset of files from a larger superset of files that is recommended for storage in a particular folder, so that only those files of the subset, and not the remainder of the files in the larger superset, are stored in the recommended folder. Additionally or alternatively, user 190 may alter a folder recommendation, e.g., by modifying a suggested name for a new folder, renaming an existing folder in which file(s) were recommended to be filed, etc.

At block 410, the system, e.g., by way of filing agent 128, may cause the recommendation to be implemented automatically, e.g., by filing agent 128 executing a shell script containing commands to move the files to the various recommended locations. It should be understood that users are not always presented with recommendations to accept or reject. In some implementations, files may be processed to determine suitable locations of a filesystem hierarchy, and then the files may be filed by filing agent 128 in those suitable locations automatically, e.g., without the user being involved.

In some scenarios, the files to be organized may include different versions of files that are already stored in the destination filesystem. For example, a file a user uploads may be a more, or less, up-to-date version of a file that already exists on filesystem 100. In some implementations, techniques described herein may be used to generate recommendations that account for scenarios such as this. For example, in some implementations, prompt assembly engine 102 may assemble into an input prompt (e.g., at block 402) a command to consolidate files that, while not exact copies, contain duplicative information to existing files. For example, if a user obtains a copy of a spreadsheet and adds new information to the copy, techniques described herein may cause a recommendation to be generated to replace the original spreadsheet already stored in filesystem 100 with the copy, since the original spreadsheet may now be outdated. Alternatively, if the file already stored on filesystem 100 has been updated more recently than the one the user wishes to upload, the generative model recommendation may be to refrain from replacing the existing file. And if the files have diverged at some point, the recommendation may be to store the user's file using a different suggested filename, or to consolidate the files.

In some implementations in which multiple selected or newly uploaded/create files are to be filed at once (e.g., as a batch), the plurality of files may be grouped into clusters. Data indicative of the clusters may be assembled into the input prompt by prompt assembly engine 102. For example, prompt assembly engine 102 may include an explicit or implicit indication in the input prompt that particular files are clustered together, e.g., by tagging them with a common label, placing them in brackets or parenthesis, placing them in a particular order such that names of clustered files are adjacent each other in the input prompt, etc.

This grouping into clusters may be based on various factors, such as computed embeddings for the plurality of files. For example, textual files may be encoded/quantified into vectors/embeddings using encoding techniques such as word2Vec or other similar techniques. Images may be encoded into reduced dimensionality vectors/embeddings using machine learning models such as transformers, convolutional neural networks (CNNs), etc.

In some implementations, individual files may be encoded into embeddings that may be used to match those individual files to destination folders. Folder embeddings may be generated (e.g., precomputed or on the fly) by processing files stored within those folders. Folder embeddings may then be used as queries to locate files (e.g., using techniques such as cosine similarity) that may be suitable for storage in those folders.

The grouping into clusters may be based on other factors as well, such as one or more demonstration filesystem hierarchies, metadata associated with the plurality of files to be filed, MIME types of the plurality of files to be filed, creation dates of the plurality of files to be filed, access or modification histories of the plurality of files to be filed, or topics of the plurality of files to be filed (topics can include keywords extracted from the files, keywords extracted from summaries generated from the files, e.g., using generative models, and so forth).

In some cases a user may wish to organize selected and/or newly created/uploaded files to folders that do not yet exist, either in a whole new filesystem hierarchy or as a new "branch" of an existing filesystem hierarchy. Referring now to FIG. 5, an example method 500 is depicted for carrying out selected aspects of the present disclosure. For convenience, the operations of the flowchart are described with reference to a system that performs the operations. This system may include various components of various computer systems, including those depicted in FIGS. 1-3. Moreover, while operations of method 500 are shown in a particular order, this is not meant to be limiting. One or more operations may be reordered, omitted or added.

At block 502, the system, e.g., by way of prompt assembly engine 102, may assemble, as an input prompt (e.g., 108, 208, 308) for a generative model (e.g., 106), data indicative of one or more files to be filed within a new filesystem hierarchy (or within a new portion of an existing filesystem hierarchy, as was shown in FIG. 3). Prompt assembly engine 102 may also assemble, into the input prompt, data indicative of one or more demonstration filesystem hierarchies (e.g., 114-114B, 234, 334) and a command to generate the new filesystem hierarchy (or the new portion of the existing filesystem hierarchy, as was shown in FIG. 3).

At block 504, the system, e.g., by way of GMAgent 104, may process the input prompt to generate output that includes, for instance, commands to create folders that will form the new filesystem hierarchy (or the new portion of the existing filesystem hierarchy, as was the case in FIG. 3). These commands may include, for instance, shell commands such as "mkdir," "mv," etc. In other implementations, the output generated by GMAgent 104 may include structured text (e.g., XML, JSON, GML, etc.) that describes the new filesystem hierarchy, and which can be used to generate it.

At block 506, the system, e.g., by way of filing agent 128, may execute the commands (if generated) to create folders forming the new file hierarchy. For example, the commands may simply be a list of shell commands, and the operating system, filesystem manager, or shell manager may execute these commands to implement the creation of the new filesystem hierarchy (or the new portion of the existing hierarchy, as was the case in FIG. 3). At block 508, the file(s) selected/created/uploaded by the user may be stored in recommended folders of the new filesystem hierarchy, e.g., by execution of additional shell commands by filing agent 128.

Referring now to FIG. 6, an example method 600 is depicted for carrying out selected aspects of the present disclosure. For convenience, the operations of the flowchart are described with reference to a system that performs the operations. This system may include various components of various computer systems, including those depicted in FIGS. 1-3. Moreover, while operations of method 600 are shown in a particular order, this is not meant to be limiting. One or more operations may be reordered, omitted or added.

At block 602, the system may identify selected folder(s) of a given, existing filesystem hierarchy. These folders may be, for instance, selected by a user. At block 604, the system, e.g., by way of prompt assembly engine 102, may assemble, as an input prompt (e.g., 108, 208, 308) for a generative model (e.g., 106), data indicative of the one or more selected folders (e.g., folder names and/or IDs, parent IDs, etc.), data indicative of the given filesystem hierarchy (e.g., JSON, XML, GML, etc.), and data indicative of a plurality of candidate files for filing in the one or more selected folders. The latter data may include, for instance, filenames of the to-be-filed files, metadata of those files, summaries of those files (e.g., generated using generative model(s)), and so forth.

At block 606, the system, e.g., by way of GMAgent 104, may process the input prompt using generative model(s) (e.g., 104) to generate one or more recommendations (e.g., 124) of one or more of the candidate files to be filed in one or more of the selected folders. At block 608, the system may optionally cause output to be rendered that conveys these recommendations, e.g., along with selectable elements that can be actuated to automatically implement or dismiss those recommendations. At block 610, the system may receive user input accepting one or more of the recommendations, and in response, at block 612, filing agent 128 may automatically implement the recommendations. For example, the output of the generative model (e.g., during the processing of block 606 or during subsequent processing to cause shell commands to be generated) may include shell commands that, when executed by filing agent 128, cause the files to be moved to the recommended folders.

Figure 7:
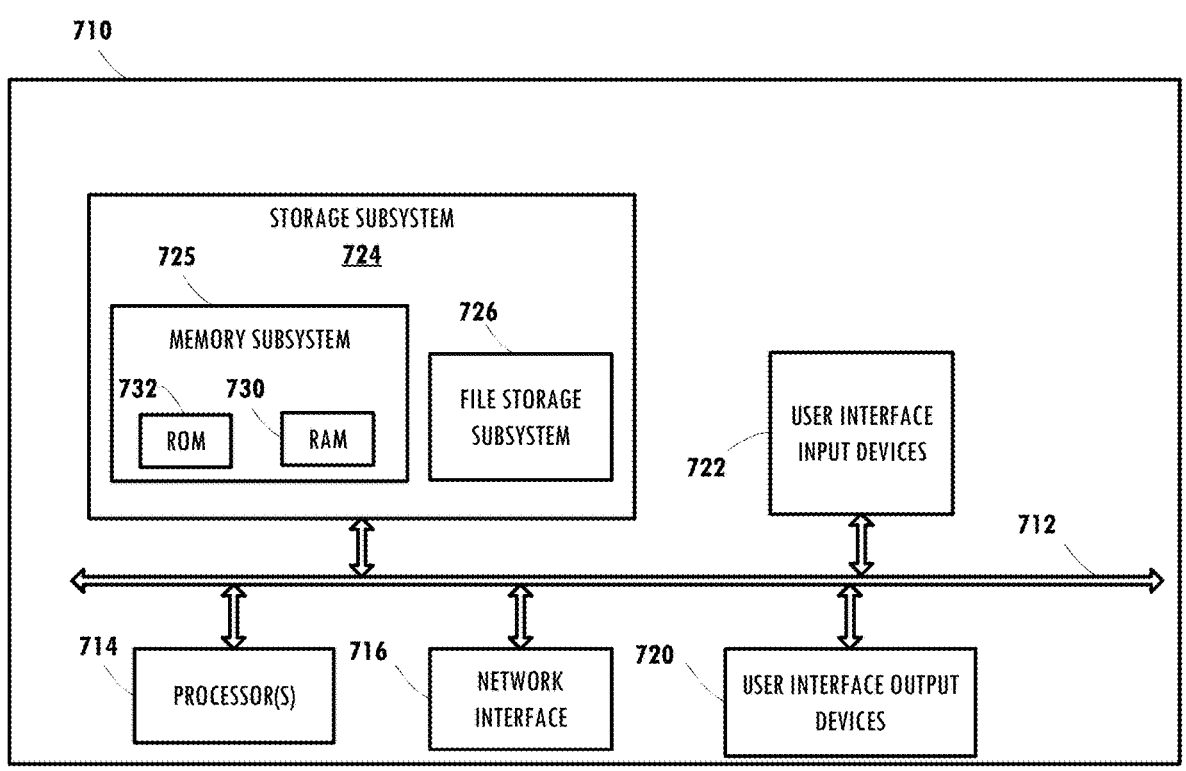
FIG. 7 schematically depicts an example computer architecture.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of methods 400-600, and/or to implement one or more aspects of the various components depicted in FIGS. 1 and/or 2. Memory subsystem 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple buses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
   assembling, as an input prompt for a generative model, data indicative of:
      one or more files to be filed within a given filesystem hierarchy, and
      one or more existing filesystem hierarchies, each representing a demonstration of a file organization structure;
   processing the input prompt using the generative model to analyze the one or more files in relation to the file organization structure of the one or more existing filesystem hierarchies to generate one or more recommendations of one or more folders within the given filesystem hierarchy for storing one or more of the files, wherein each of the one or more recommendations identifies a respective storage path within the given filesystem hierarchy for at least one of the one or more files; and
   causing output to be rendered on one or more output devices, wherein the output conveys one or more of the recommendations, and
   in response to receiving a user input accepting one of the one or more recommendations, implementing the accepted recommendation by storing at least one of the one or more files at the specific storage path identified by the accepted recommendation.

2. The method of claim 1, wherein the data indicative of the one or more existing filesystem hierarchies includes data indicative of the given filesystem hierarchy.

3. The method of claim 1, wherein the data indicative of the one or more existing filesystem hierarchies includes one or more demonstration filesystem hierarchies.

4. The method of claim 3, wherein the input prompt is further assembled to include a command to create all or part of the given filesystem hierarchy based on one or more of the demonstration filesystem hierarchies.

5. The method of claim 4, wherein the command is to create all or part of the given filesystem hierarchy based on one or more of the demonstration filesystem hierarchies and one or more of the files to be filed within the given filesystem hierarchy.

6. The method of claim 3, wherein one or more of the demonstration filesystem hierarchies is associated with a user account of a user who has requested the one or more recommendations.

7. The method of claim 1, wherein the data indicative of the one or more existing filesystem hierarchies includes names assigned to individual files and folders of the given filesystem hierarchy.

8. The method of claim 1, wherein the data indicative of the one or more existing filesystem hierarchies includes metadata associated with individual files or folders of one or more of the existing filesystem hierarchies.

9. The method of claim 8, wherein the metadata associated with individual files or folders of one or more of the existing filesystem hierarchies includes user or group permissions assigned to individual files or folders of one or more of the existing filesystem hierarchies.

10. The method of claim 9, wherein the input prompt is further assembled to include a request that one or more of the recommendations include a recommendation for a folder in which one or more of the files are to be stored, conditioned on one or more of the user or group permissions.

11. The method of claim 8, wherein the metadata associated with individual files or folders of one or more of the existing filesystem hierarchies includes access histories or creation or modification times of the individual files or folders of one or more of the existing filesystem hierarchies.

12. The method of claim 8, wherein the metadata for at least some of the files or folders of one or more of the existing filesystem hierarchies includes a parent ID.

13. The method of claim 12, wherein one or more of the recommendations include a parent and file ID pair that identifies a destination for one or more of the files.

14. The method of claim 8, wherein the metadata for at least one of the folders of one or more of the existing filesystem hierarchies includes a short description of contents of the at least one folder.

15. The method of claim 14, wherein the short description is generated automatically by processing at least some documents within the at least one folder using the same generative model or a different generative model.

16. The method of claim 8, wherein the metadata associated with individual files or folders of one or more of the existing filesystem hierarchies includes MIME types.

17. The method of claim 1, further comprising automatically storing the one or more files in non-transitory computer memory in accordance with the given filesystem hierarchy and one or more of the recommendations.

18. The method of claim 1, further comprising:
   detecting user selection of an individual folder within the given filesystem hierarchy; and
   assembling, into the input prompt, a command to recommend one or more of the files for storage within the individual folder, wherein one or more of the recommendations comprises a recommendation to store one or more of the files within the individual folder.

19. A system comprising one or more processors and memory storing instructions that, in response to execution by the one or more processors, cause the one or more processors to:
   assemble, as an input prompt for a generative model, data indicative of:
      one or more files to be filed within a given filesystem hierarchy, and
      one or more existing filesystem hierarchies, each representing a demonstration of a file organization structure;
   process the input prompt using the generative model to analyze the one or more files in relation to the file organization structure of the one or more existing filesystem hierarchies to generate one or more recommendations of one or more folders within the given filesystem hierarchy for storing one or more of the files, wherein each of the one or more recommendations identifies a respective storage path within the given filesystem hierarchy for at least one of the one or more files; and
   cause output to be rendered on one or more output devices, wherein the output conveys one or more of the recommendations, and
   in response to receiving a user input accepting one of the one or more recommendations, implementing the accepted recommendation by storing at least one of the one or more files at the specific storage path identified by the accepted recommendation.

20. At least one non-transitory computer-readable medium comprising instructions that, in response to execution by one or more processors, cause the one or more processors to:
   assemble, as an input prompt for a generative model, data indicative of:
      one or more files to be filed within a given filesystem hierarchy, and
      one or more existing filesystem hierarchies, each representing a demonstration of a file organization structure;
   process the input prompt using the generative model to analyze the one or more files in relation to the file organization structure of the one or more existing filesystem hierarchies to generate one or more recommendations of one or more folders within the given filesystem hierarchy for storing one or more of the files, wherein each of the one or more recommendations identifies a respective storage path within the given filesystem hierarchy for at least one of the one or more files; and
   cause output to be rendered on one or more output devices, wherein the output conveys one or more of the recommendations, and
   in response to receiving a user input accepting one of the one or more recommendations, implementing the accepted recommendation by storing at least one of the one or more files at the specific storage path identified by the accepted recommendation.

* * * * *